United States Patent
Bergenlid et al.

(10) Patent No.: US 7,613,147 B2
(45) Date of Patent: Nov. 3, 2009

(54) PACKET-BASED CONVERSATIONAL SERVICE FOR A MULTIMEDIA SESSION IN A MOBILE COMMUNICATIONS SYSTEM

(75) Inventors: Lars Herbert Bergenlid, Sollentuna (SE); Magnus Olsson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 11/806,569

(22) Filed: Jun. 1, 2007

(65) Prior Publication Data

US 2007/0237134 A1 Oct. 11, 2007

Related U.S. Application Data

(62) Division of application No. 10/347,501, filed on Jan. 21, 2003.

(60) Provisional application No. 60/354,483, filed on Feb. 8, 2002.

(51) Int. Cl.
*H04W 4/00* (2006.01)
*H04J 1/00* (2006.01)
*H04L 12/40* (2006.01)

(52) U.S. Cl. ............... 370/329; 370/343; 370/438

(58) Field of Classification Search ............... None
See application file for complete search history.

(56) References Cited

U.S. PATENT DOCUMENTS

| 6,529,475 | B1 * | 3/2003 | Wan et al. ............... 370/231 |
| 6,532,225 | B1 | 3/2003 | Chang et al. |
| 6,847,610 | B1 | 1/2005 | Suumaki et al. |
| 7,023,855 | B2 * | 4/2006 | Haumont et al. ........ 370/395.1 |
| 7,123,920 | B1 * | 10/2006 | Faccin et al. ............... 455/450 |
| 7,171,204 | B2 | 1/2007 | Yuen |

(Continued)

FOREIGN PATENT DOCUMENTS

EP    1 313 344 A2    5/2003

(Continued)

OTHER PUBLICATIONS

3 GPP Technical Specification 23.107, Release 1999, entitled "3rd Generation Partnership Project (3GPP): Technical Specification Group Services and System Aspects: QoS Concepts and Architectures".*

(Continued)

*Primary Examiner*—Kwang B Yao
*Assistant Examiner*—Jutai Kao
(74) *Attorney, Agent, or Firm*—Nixon & Vanderhye P.C.

(57) ABSTRACT

An important objective for third generation mobile communications systems is to provide IP services, and a very important part of these services will be the conversational voice. The conversational voice service includes three distinct information flows: session control, the voice media, and the media control messages. In a preferred embodiment, based on the specific characteristics for each information flow, each information flow is allocated its own bearer with a Quality of Service (QoS) tailored to its particular characteristics. In a second embodiment, the session control and media control messages are supported with a single bearer with a QoS that suits both types of control messages. Both embodiments provide an IP conversational voice service with increased radio resource efficiency and QoS.

11 Claims, 9 Drawing Sheets

U.S. PATENT DOCUMENTS

| | | |
|---|---|---|
| 7,221,657 B2 | 5/2007 | Bergenlid et al. |
| 2002/0015391 A1 | 2/2002 | Kriaras et al. |
| 2002/0034166 A1* | 3/2002 | Barany et al. ............... 370/329 |
| 2002/0114306 A1* | 8/2002 | Kuusinen et al. ............ 370/342 |
| 2002/0122432 A1 | 9/2002 | Chaskar |
| 2003/0108020 A1* | 6/2003 | Garcia-Martin ............. 370/338 |
| 2003/0152060 A1* | 8/2003 | Danneel et al. ............. 370/342 |
| 2004/0196805 A1* | 10/2004 | Lee ........................... 370/329 |
| 2004/0252661 A1 | 12/2004 | Lintulampi et al. |
| 2005/0063332 A1* | 3/2005 | Holtzman et al. ........... 370/328 |
| 2006/0078000 A1 | 4/2006 | Rinne et al. |

FOREIGN PATENT DOCUMENTS

| | | |
|---|---|---|
| WO | WO 99/66736 | 12/1999 |
| WO | WO 01/41472 A1 | 6/2001 |
| WO | WO 02/080452 A2 | 10/2002 |

OTHER PUBLICATIONS

Svanbro, Krister et al., "Voice-Over-IP-Over Wireless", 11th IEEE International symposium on Personal Indoor and Mobile Radio Communications, vol. 1, Sep. 19, 2000, pp. 24-28.

U.S. Appl. No. 09/985,573, filed Nov. 5, 2001, Ina Widegren et al.

U.S. Appl. No. 09/985,631, filed Nov. 5, 2001, Ina Widegren et al.

U.S. Appl. No. 10/038,770, filed Jan. 8, 2002, Ina Widegren et al.

U.S. Appl. No. 10/356,737, filed Feb. 3, 2003, Lars Bergenlid et al.

U.S. Appl. No. 10/347,501, filed Jan. 21, 2003, Lars Bergenlid.

* cited by examiner

PACKET-BASED CONVERSATIONAL SERVICE FOR A MULTIMEDIA SESSION IN A MOBILE COMMUNICATIONS SYSTEM

PROVISIONAL APPLICATION

This application is a divisional of U.S. application Ser. No. 10/347,501, filed on Jan. 21, 2003, which claims the benefit of U.S. Provisional Application 60/354,483 filed Feb. 8, 2002, the entire contents of which are hereby incorporated by reference in this application.

CROSS-REFERENCE TO RELATED APPLICATIONS

This application is related to commonly-assigned U.S. patent application Ser. No. 09/985,573, entitled "Media Binding to Coordinating Quality of Service Requirements for Media Flows in a Multimedia Session with IP Bearer Resources," filed Nov. 5, 2001; and U.S. patent application Ser. No. 09/985,631, entitled "Method and Apparatus for Coordinating Quality of Service Requirements for Media Flows in a Multimedia System With IP Bearer Resources," filed Nov. 5, 2001; U.S. patent application Ser. No. 10/038,770, entitled "Method and Apparatus for Coordinating End-to-End Quality of Service Requirements for Media Flows in a Multimedia Session," filed Jan. 8, 2002; U.S. patent application Ser. No. 10/353,737, entitled "Processing Different Size Packet Headers for a Packet-Based Conversational Service in a Mobile Communications System," filed Feb. 3, 2003, the disclosures of which are incorporated herein by reference.

FIELD OF THE INVENTION

The present invention relates to Internet Protocol (IP) multimedia communications in a mobile network where time-sensitive services, such as voice, are effectively and efficiently supported.

BACKGROUND AND SUMMARY

Fixed IP networks were originally designed to carry "best effort" traffic where the network makes a "best attempt" to deliver a user packet, but does not guarantee that a user packet will arrive at the destination. IP networks need to support various types of applications. Some of these applications have Quality of Service (QoS) requirements other than "best effort" service. Examples of such applications include various real time applications (IP telephony/voice, video conferencing), streaming services (audio or video), or high quality data services (browsing with bounded download delays). Recognizing these QoS requirements, the Internet Engineering Task Force (IETF), which is the main standards body for IP networking, standardized a set of protocols and mechanisms that enable IP network operators to build QoS-enabled IP networks. But these protocols and mechanisms where designed with fixed, wire-line networks in mind. New and different challenges face IP communications in mobile, wireless communication networks.

Quality of service is important for providing end users with satisfying service. The efficient use of the radio resources is also important to ensure maximum capacity and coverage for the system. Quality of service can be characterized by several performance criteria such as throughput, connection setup time, percentage of successful transmissions, speed of fault detection and correction, etc. In an IP network quality of service can be measured in terms of bandwidth, packet loss, delay, and jitter.

Consider for example an IP telephony session between User-A and User-B where User-A accesses an IP backbone through a local access, mobile communications network In wireline communications, a local access network is often a Public Switched Telephone Network (PSTN) or an Integrates Services Digital Network (ISDN). But for communications involving a mobile radio, the local access network must include a radio access network Example mobile communication networks include the Global System for Mobile communications (GSM) or the Universal Mobile Telecommunications System (UMTS) network User-B is similarly connected to the IP network through a local access network, and both users may not use the same type of access network The IP backbone network includes a number of IP routers and interconnecting links that together provide connectivity between the IP network's ingress and egress points and thereby make two party communication possible.

As far as the users are concerned, the perceived quality of service depends on the service provided both in the local access networks and on the IP backbone network Of particular interest is the specific case where at least one of the access networks is a mobile communications network like a or GSM/GPRS network The radio interface in such a network is the most challenging interface in the communication in terms of delivering a particular quality of service.

An objective of third generation mobile communications systems, like Universal Mobile Telephone communications System (UMTS), is to provide mobile radios with the ability to conduct multimedia sessions where a communication session between users may include different types of media. Perhaps the most important medium to support in multimedia sessions is voice. There is a need for more resource-efficient, packet-based conversational (e.g., voice) multimedia services. Although the idea of conversational IP services is desirable, a practical implementation of a conversational IP service requires overcoming several technical hurdles before the idea becomes a commercial reality. Conversational IP services should deliver high speech quality both in terms of fidelity and low delay. Connection set up and service interaction times should be reasonably fast. Indeed, packet-based voice service should be comparable to circuit-switched traditional voice telephony. The radio spectrum must be used efficiently. Services must cover a wide geographic area and be able to service roaming users. Because voice is only one component in a multimedia session, it should be established and disconnected independently from the session.

There are three distinct information flows to be considered for a conversational IP voice service. Each flow affects the overall performance of the IP voice service. For example, the voice media flow is crucial when it comes to providing high speech quality. The session control flow is important when it comes to service set-up times/delays, and the media control protocol is primarily used to monitor media flows and provide information allowing the synchronization of different media flows.

In addition, network operators must be able to provide the conversational IP service at a reasonable cost. Although fixed, wire-line access networks like LAN's permit over-provisioning, wireless networks cannot afford that luxury because of limited radio bandwidth and the need to support user mobility. An objective of the present invention is to provide an efficient way to transport these three information flows.

The three information flows have different needs and characteristics. Quality of Service (QoS) parameters of special importance to session signaling include bit rate, delay, and priority. Session signaling is mostly low volume with a small average bandwidth demand. But the transmission rate still needs to be fairly high to reduce delay. Delay time is also influenced by bearer-handling delays and retransmissions over the air interface. Under heavy load conditions, session signaling should get priority. The session signaling should not be put on a bearer that carries a large volume of user data because the session signaling can not then be prioritized above the user data, resulting in undesired delays. Therefore, the session signaling may be transported using a separate packet data "context" between the mobile terminal and a packet-based access network with an interactive class of QoS. This session signaling packet data context is supported by a dedicated bearer with an interactive class of QoS. Logical connections, like a packet data context, a radio access bearer, a radio bearer, etc., are generally referred to as "bearers."

The voice media packets carry regularly-generated voice samples, e.g., every 20 ms, and each packet has a relatively small payload size. Those voice packets must be received by the remote terminal with the same timing, e.g., every 20 ms, in order to have a reasonable voice quality. Both objectives are met in accordance with another aspect of the present invention where the voice media flow is transported using a separate packet context between the mobile terminal and a packet-based access network with a conversational class of QoS. The voice media packets are supported by a dedicated bearer with a conversational class of QoS characteristics.

Compared to voice media packets, voice media control message packets are considerably larger in size and are sent less frequently, e.g., every few seconds. But there is no strict delay or jitter requirement like there is for voice packets. For media control message packets, a conversational radio access bearer would waste radio resources. Alternatively, transporting the media control message packets on the same radio access bearer as the voice packets would delay the voice packets causing a disruption in speech. To mitigate this problem requires allocating more resources to a single bearer than would be needed for two bearers. Thus, the media control signaling may be transported using a separate packet data "context" between the mobile terminal and a packet-based access network with an interactive class of QoS. This media control signaling packet data context is supported by a dedicated bearer with an interactive class of QoS characteristics.

Thus, in a preferred example embodiment, each of these three information flows required for a conversational IP voice service is allocated its own bearer and packet data context with a QoS class tailored to the characteristics of each flow. In this way, high quality, packet-based voice service can be provided with radio resources being efficiently allocated in accordance with the particular needs for the different information flows.

In a second example embodiment, the session signaling and the voice media control messages share a single radio bearer with an interactive class of QoS characteristics. As in the first embodiment, the voice media packets are supported by a dedicated bearer with a conversational class of QoS characteristics. Because the session signaling load normally is heavy during the session setup and the voice media control message load normally picks up after the session is setup, one interactive QoS bearer supports both the session setup signaling and the voice media control signaling. Although there may be some delays whenever there is overlapping session signaling and voice media control signaling require transmission at the same time, those delays may be an acceptable tradeoff to reduce the number of bearers by one.

BRIEF DESCRIPTION OF THE DRAWINGS

The foregoing and other objects, features, and advantages may be more readily understood with reference to the following description taken in conjunction with the accompanying drawings.

DETAILED DESCRIPTION

Figure 1:
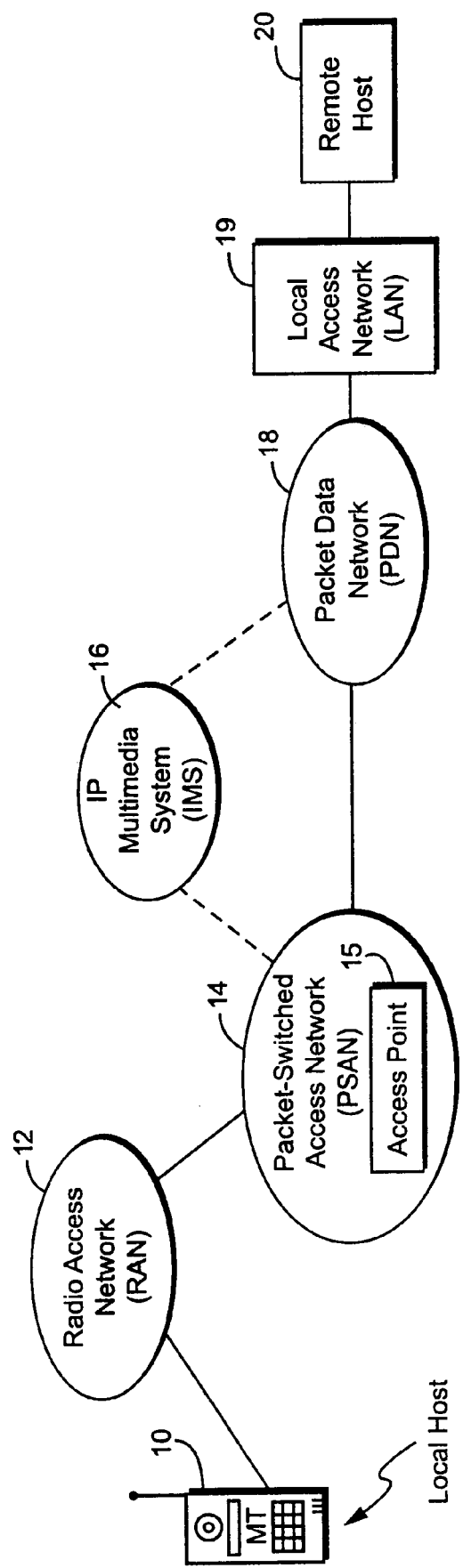
FIG. 1 illustrates a communications system in which a multimedia session may be established between a mobile terminal and a remote host.

In the following description, for purposes of explanation and not limitation, specific details are set forth, such as particular example embodiments, procedures, techniques, etc. in order to provide a thorough understanding. However, it will be apparent to one skilled in the art that the technology described may be practiced in other embodiments that depart from these specific details. For example, in one example below, the technology is described in an example application to a GSM/UMTS system. However, the present invention may be employed in any access network.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs). This is true for all of the nodes described below including mobile terminals and network nodes.

In the following description, a mobile terminal is used as one example of a user equipment (UE) allowing a mobile user access to network services. In a mobile radio communications system, the interface between the user equipment and the network is the radio interface. Thus, although following description uses the term "mobile terminal," the present invention may be applied to any type or configuration of user equipment that can communicate over a radio interface.

To realize a QoS with clearly defined characteristics and functionality, a bearer must be set up from the source to the destination of the service that supports that QoS. A "bearer" is a logical connection between two entities through one or more interfaces, networks, gateways, etc., and usually corresponds to a data stream. Non-limiting examples of bearers used in the example embodiments below include a packet data context, a radio access bearer, and a radio bearer. A QoS bearer service includes all aspects to enable the provision of a contracted QoS. Example aspects include the control signaling, user plane transport, and QoS management functionality.

To provide IP quality of service end-to-end from mobile terminal to a remote host, it is necessary to manage the quality of service within each domain in the end-to-end path where each domain corresponds to a set of nodes utilizing the same QoS mechanisms. For purposes of simplifying the description, only the bearers and selected signaling employed in establishing and maintaining a packet-based voice session from the mobile terminal up to the IP backbone network are described. A packet-based voice session may be a voice only call or a multi-media call with a voice being one of the media. For purposes of illustration only, a multi-media session that includes a voice information flow is described below, with only the voice part being described. The technology may be applied to IP voice communication that is not part of a multimedia session.

A simplified communications system shown in FIG. 1 where a Mobile Terminal (MT) 10 may initiate and conduct a multimedia session with a remote host 20. The mobile terminal 10 is coupled to a radio access network (RAN) 12 over the radio interface. The RAN 12 is coupled to an Access Point 15 in a packet-switched access network (PSAN) 14. If desired, the access point 15 may function as a protocol proxy for the MT local host. The PSAN 14 is coupled to a Packet Data Network (PDN) 18 to which the remote host 20 is coupled via a local access network (LAN) 19. The basic traffic flow for a multimedia session (shown as solid lines) between the mobile terminal 10 and remote host 20 is transported via these three networks 12, 14, and 18. The PSAN 14 and the PDN 18 communicate multimedia control signaling (shown as dashed lines) to an IP Multimedia System (IMS) 16 that can be separate from or an integral part of the Packet Data Network 18.

Figure 2:
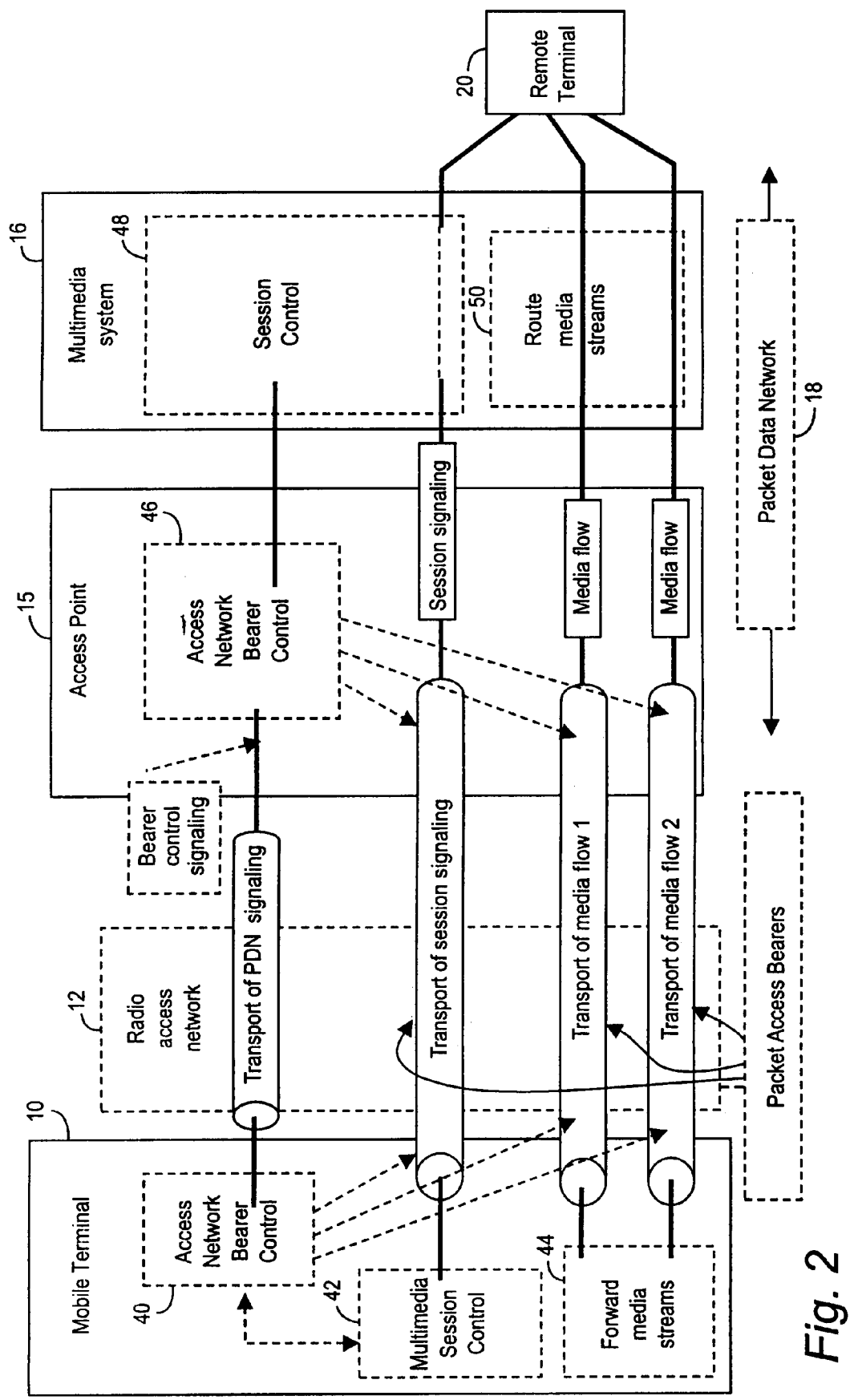
FIG. 2 illustrates in block format various functions performed by the mobile terminal, access point, and multimedia system.

To provide further details regarding setting up a multimedia session between the MT 10 and the remote host 20, reference is now made to FIG. 2. The mobile terminal 10 includes Access Network Bearer Control 40 coupled to multimedia session control 42. The Access Network Bearer Control block 40 transports internal bearer control signaling, which is not dedicated to a particular session, to an Access Network Bearer Control block 46 in the Access Point 15 transparently through the radio access network over a PDN signaling transport bearer. Both Access Network Bearer Control blocks 40 and 46 assist in establishing a packet access bearer for setting up the session shown as the pipe entitled "transport of session signaling." Over this bearer, the mobile terminal 10 initiates a multimedia session including a plurality of media data streams with the remote terminal 20. Each media data stream or "flow" is transported over a corresponding packet access bearer illustrated as a "transport of media flow" pipe coupled to a Forward Media Streams block 44 in the mobile terminal. Two media flows 1 and 2 are shown for purposes of illustration in this multimedia session. The multimedia system 16 in the packet data network 18 employs a Route Media Streams block 50 to route the packets in each media flow between the mobile terminal 10 and the remote terminal/host 20. Multimedia system 16 includes a Session Control block 48 that utilizes session signaling from the MultimedialSession Control block 42 in the mobile terminal 10 to correlate each multimedia flow and its corresponding quality of service requirements with the session to establish necessary admission rules for the session.

For a session involving voice IMS services, there are at least three information flows that must be transported between the mobile terminal and the network: session control messages, the voice media itself, and voice media control messages. The three information flows have different needs and characteristics. QoS parameters of special importance to session signaling include bit rate, delay, and priority. Each of the three information flows required for a conversational IMS voice service is allocated its own bearer with a QoS class tailored to the characteristics of each flow. In a preferred, example embodiment, each information flow is allocated a packet data context and a supporting radio access bearer both having the appropriate QoS.

Because of its mostly low volume with a low, average bandwidth demand, its need for low delay (including bearer handling delays and retransmissions over the air interface), and its need for priority in heavy load conditions, the session signaling is transported using a packet data context and a radio access network bearer that both support an interactive class of QoS characteristics. The interactive class provides a maximum bit rate, delivery order, maximum data unit size, a residual bit error ratio, delivery of erroneous data units, and priority handling.

The strict periodicity required for voice packets, e.g., one every 20 ms, the relatively small payload size of each voice packet, and the need for the remote terminal to receive those packets at the same periodicity, e.g., every 20 ms, in order to have a reasonable voice quality led the inventors to transport the voice media flow using a packet data context and a radio access network bearer that both support a conversational class of QoS characteristics. The conversational class provides a maximum bit rate, guaranteed bit rate, minimum transfer delay, delivery order, maximum data unit size, a residual bit error ratio, and delivery of erroneous data units.

In contrast, the voice media control message packets are considerably larger in size and are sent less frequently, e.g., every few seconds. But there is no strict delay or jitter requirement like there is for voice packets. A conversational radio access bearer would waste resources. Transporting the voice media control message packets on the same radio access bearer as the voice packets would delay the voice packets causing a disruption in speech. To mitigate that problem requires allocating more resources to a single bearer than would be needed for two bearers. Having similar needs as the session signaling, the media control signaling is transported using a packet data context and a radio access network bearer with an interactive class of QoS characteristics.

Figure 3A:
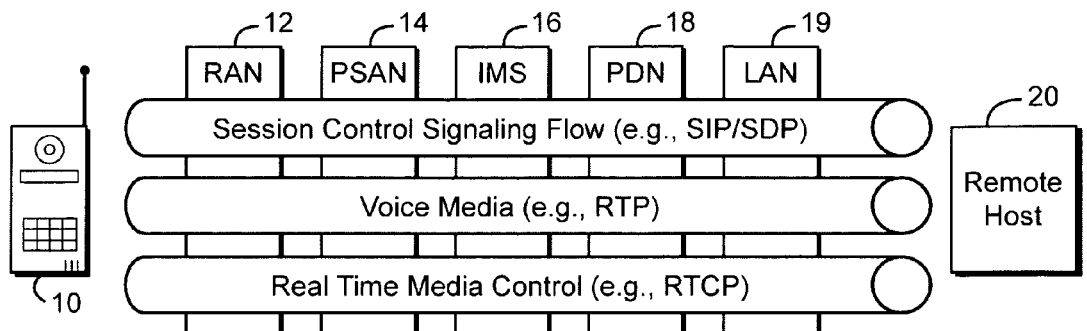
FIG. 3A is a high level diagram showing three separate bearers for supporting a packet-based voice session.

FIG. 3A illustrates a first example embodiment with the three application flows—session control signaling, voice media, and media control signaling—each being supported from the mobile terminal 10 to the remote host 20 over the RAN 12, the PSAN 14, the IMS 16, the PDN 18, and the local access network (LAN) 19. This separate support allows each application flow to be supported with a quality of service tailored to its specific needs while at the same time ensuring that limited resources are used efficiently in providing that service.

Figure 3B:
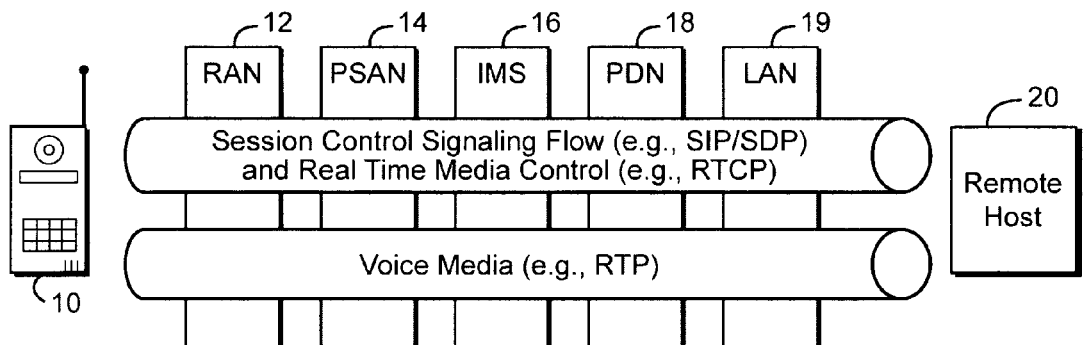
FIG. 3B is a high level diagram showing two separate bearers for supporting a packed-based voice session.

FIG. 3B illustrates a second example embodiment for the three application flows—session control signaling, voice media, and media control signaling—each being supported from the mobile terminal 10 to the remote host 20 over the RAN 12, the PSAN 14, the IMS 16, the PDN 18, and the local access network (LAN) 19. In contrast to FIG. 3A, the session and media control signaling are supported by the same bearer which has an interaction quality of service well-suited to them both.

Figure 4:
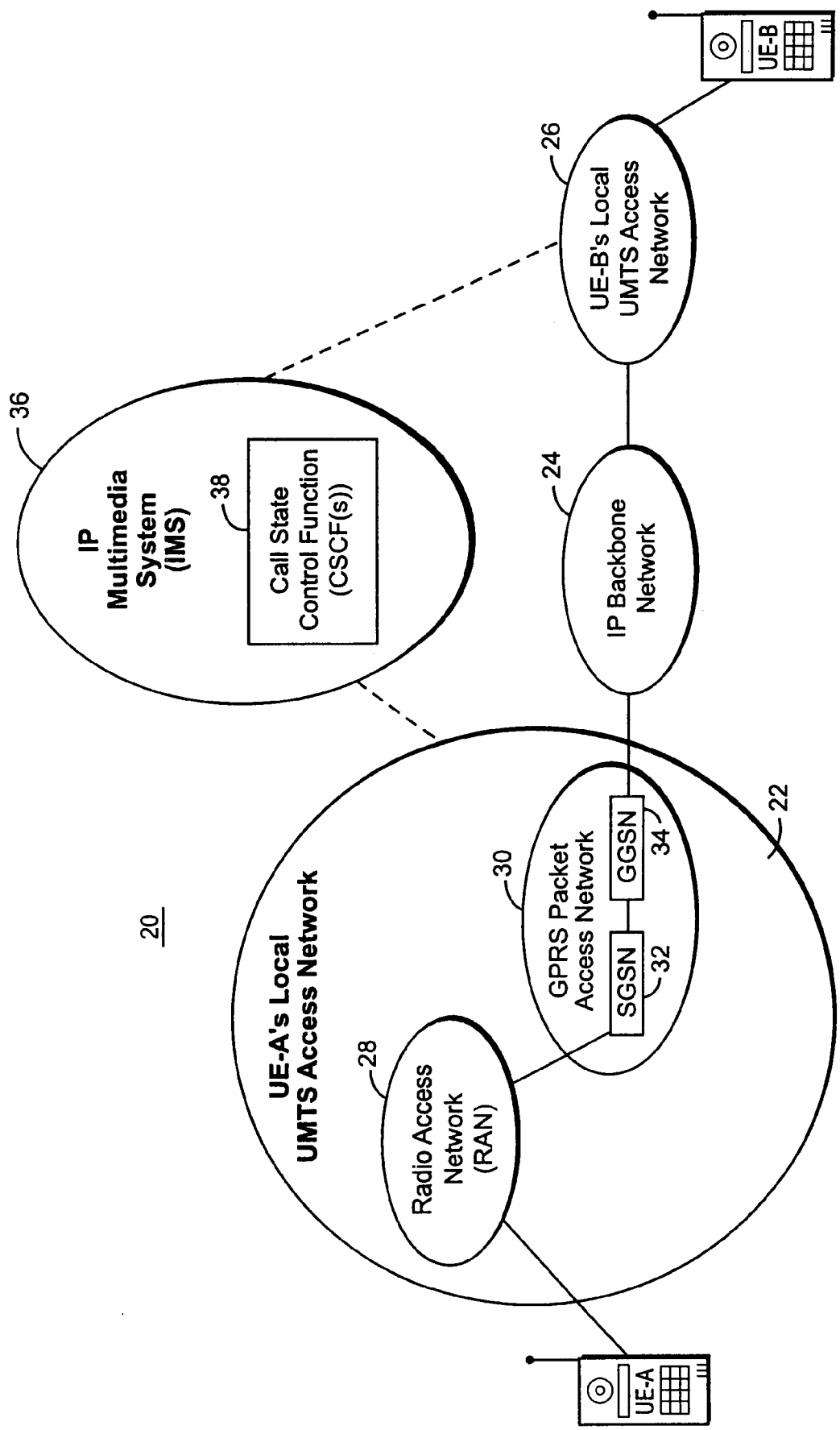
FIG. 4 illustrates a GPRS/UMTS-based communication system for conducting multimedia sessions.

A more specific (but non-limiting) example of a multimedia session set up via a local General Packet Radio Service (GPRS)/Universal Mobile Telecommunication System (UMTS)-based access network 22 is shown in FIG. 4. The local GPRS/UMTS network 22 includes a set of network elements between the local host UE-A, corresponding to a Mobile Terminal (MT), and an external packet switching network the user is connecting to, like the Internet. The radio access network (RAN) 28 provides access over the radio interface to/from the MT and includes radio base stations (RBSs) and radio network controllers (RNCs). The RAN 28 is coupled to a GPRS packet access network 30 that includes a supporting Gateway GPRS Support Node (SGSN) 32 and a Gateway GPRS Support Node (GGSN) 34. The GGSN 34 provides interworking between the GPRS/UMTS network 22 and the IP backbone network 24. The coupling (shown as a solid line) between the GPRS/UMTS network 22 and the IP backbone network 24 is used to transport user data IP packets.

The local GPRS/UMTS-type network 22 is coupled to an IP multimedia system (IMS) 36. Communication with the IMS 36 (shown as dashed lines) permits exchange of multimedia session control-related messages. The IMS 36 is typically a part of (although it may be separate from and coupled to) an IP backbone network 24. The remote host corresponding to mobile terminal UE-B is coupled to the IP backbone network 24 through its home cellular network 26, and by signaling connection, to the IMS 36.

The mobile terminal UE-A desires to establish a multimedia session with UE-B. The packet traffic for this session follows the solid line couplings between the various nodes. The session is established with and managed by the IP Multimedia System IMS 36. The IMS 36 messages are based on IP application signaling, which in a preferred, example embodiment includes session initiation protocol (SIP) and session description protocol (SDP). SIP is a signaling protocol to establish sessions, and SDP is a text-based syntax to describe the session and includes, for example, the definition of each media stream in the session. The IP multimedia system 36 includes one or more Call State Control Functions (CSCFs) 38.

Before the mobile terminal can send packet data to the remote host, the mobile terminal must "attach" to the GPRS network to make its presence known and to create a Packet Data Protocol (PDP) "context" to establish a relationship with a GGSN. The PDP context is a bearer between the mobile terminal and the GGSN. The PDP attach procedure is first carried out between the mobile terminal and the SGSN to establish a logical link. As a result, a temporary logical link identity is assigned to the mobile terminal. A PDP context is established between the mobile terminal and a GGSN selected based on the name of the external network to be reached. One or more application flows may be established over a single PDP context through negotiations with the GGSN. An application flow corresponds to a stream of data packets distinguishable as being associated with a particular host application. Example application flows include voice packets carrying digitized (and usually coded) voice samples, an electronic mail message, a link to a particular Internet Service Provider (ISP) to download a graphics file from a web site, etc. One or more application flows may be associated with the same mobile host and the same PDP context.

Within a GPRS/UMTS access network, radio network resources are managed on a per PDP context level, which corresponds to one or more user flow/data streams and a certain QoS class. A PDP context is implemented as a dynamic table of data entries, comprising all needed information for transferring PDP data units between the mobile terminal and the GGSN, e.g., addressing information, flow control variables, QoS profile, charging information, etc. The PDP context signaling carries the requested and negotiated QoS profile between the nodes in the UMTS networks It has a central role for QoS handling in terms of admission control, negotiation, and modifying of bearers on a QoS level.

Figure 5:
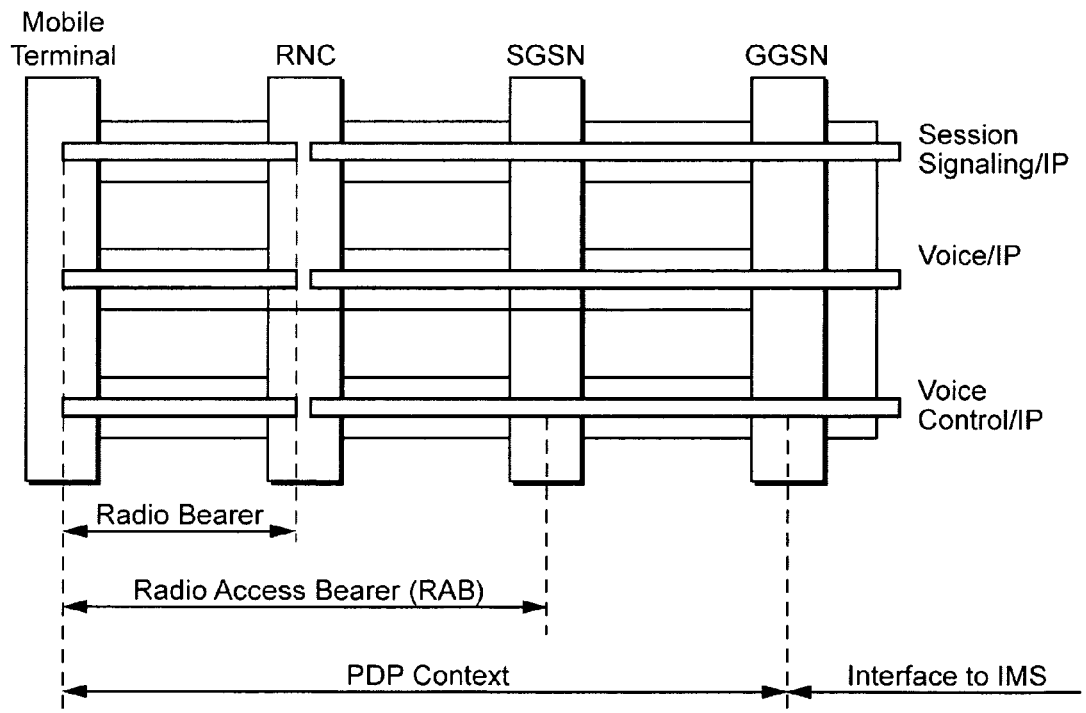
FIG. 5 is a high level diagram showing three separate bearers for supporting a packet-based voice session from the mobile terminal to the IMS interface in a GPRS/UMTS access network.

FIG. 5 illustrates the mapping between radio bearer (MT-RNC), radio access bearer (MT-SGSN), and PDP context (MT-GGSN). The relationship between a radio access bearer and a PDP context is a one-to-one mapping. A radio access bearer is mapped onto one or more radio bearers. The three IP packet flows—session signaling, voice, and media control—are transported through the UTRAN using separate radio bearers, radio access bearers, and PDP contexts. As indicated in FIGS. 3A and 3B in parentheses, example session control signaling that may be used in this example embodiment is Session Initiation Protocol (SIP) messages carrying Session Description Protocol (SDP) information over User Datagram Protocol (UDP). The voice packets may be carried in this example by the Real-Time Transport Protocol (RTP) protocol over UDP, and the control messages associated with the voice packets are Real-Time Control Protocol (RTCP) messages over UDP. Of course, other protocols and formats may be used.

Three separate PDP contexts corresponding to separate radio access bearers (RABs) and separate radio bearers (RBs) are established for the three voice IMS service flows, as described above. The QoS associated with the SIP/SDP session signaling PDP context/RAB/RB(s) is an interactive QoS class suited for a request/response pattern of communication which need to have its payload content preserved. The RTP voice media PDP context/RAB/RB(s) is a conversational QoS class suited to preserve the time relation between information entities of the stream. The RTCP voice media control signaling PDP context/RAB/RB(s) is an interactive QoS class.

Figure 6:
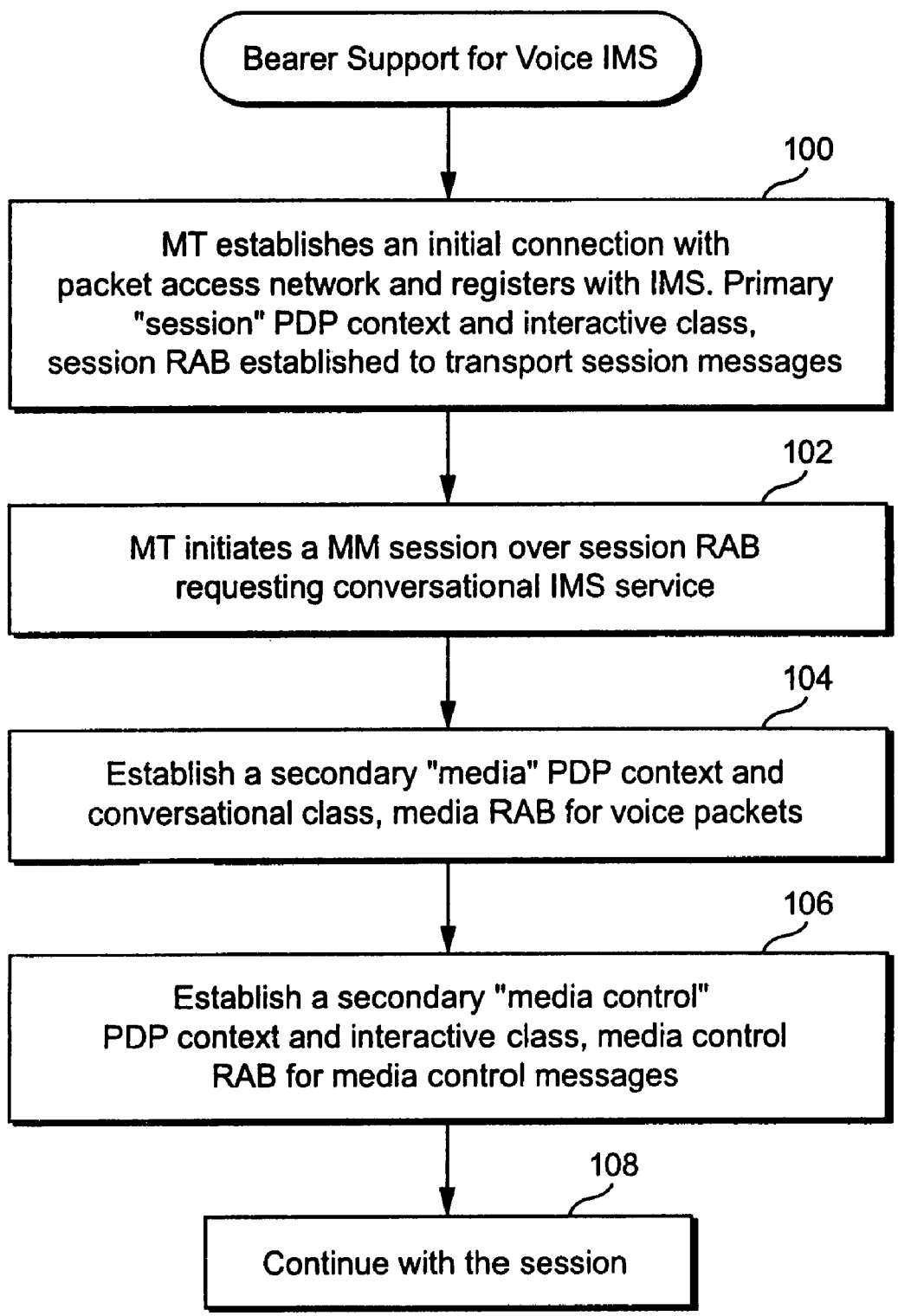
FIG. 6 is a flowchart illustrating example procedures for establishing a multimedia session with packet-based, voice IMS service.

FIG. 6 illustrates example procedures in flowchart form (entitled Bearer Support for Voice IMS) for establishing the three bearers for a voice MS session. The mobile terminal establishes an initial connection with the packet access network and registers with the IMS. A primary "session" PDP context is established over an interactive QoS class, session radio access bearer (RAB). Session signaling messages are conveyed over that RAB (block 100). A multimedia session is initiated by or with the mobile terminal over the session RAB requesting establishment of a voice or conversational IMS service (block 102). A secondary "media" PDP context is established with a conversational QoS class, media RAB to transport media (voice) packets (block 104). A secondary "media control" PDP context is established with an interactive QoS class, media control RAB to transport (block 106). Once set up, the session continues (block 108).

A way to improve the overall PDP context establishment time would be to perform combined PDP context establishments. Establishing the PDP contexts related to the media and the media control could be combined into one procedure. This combined PDP context establishment may be facilitated by introducing PDP context request and accept messages that allow for more than one PDP context.

Figure 7:
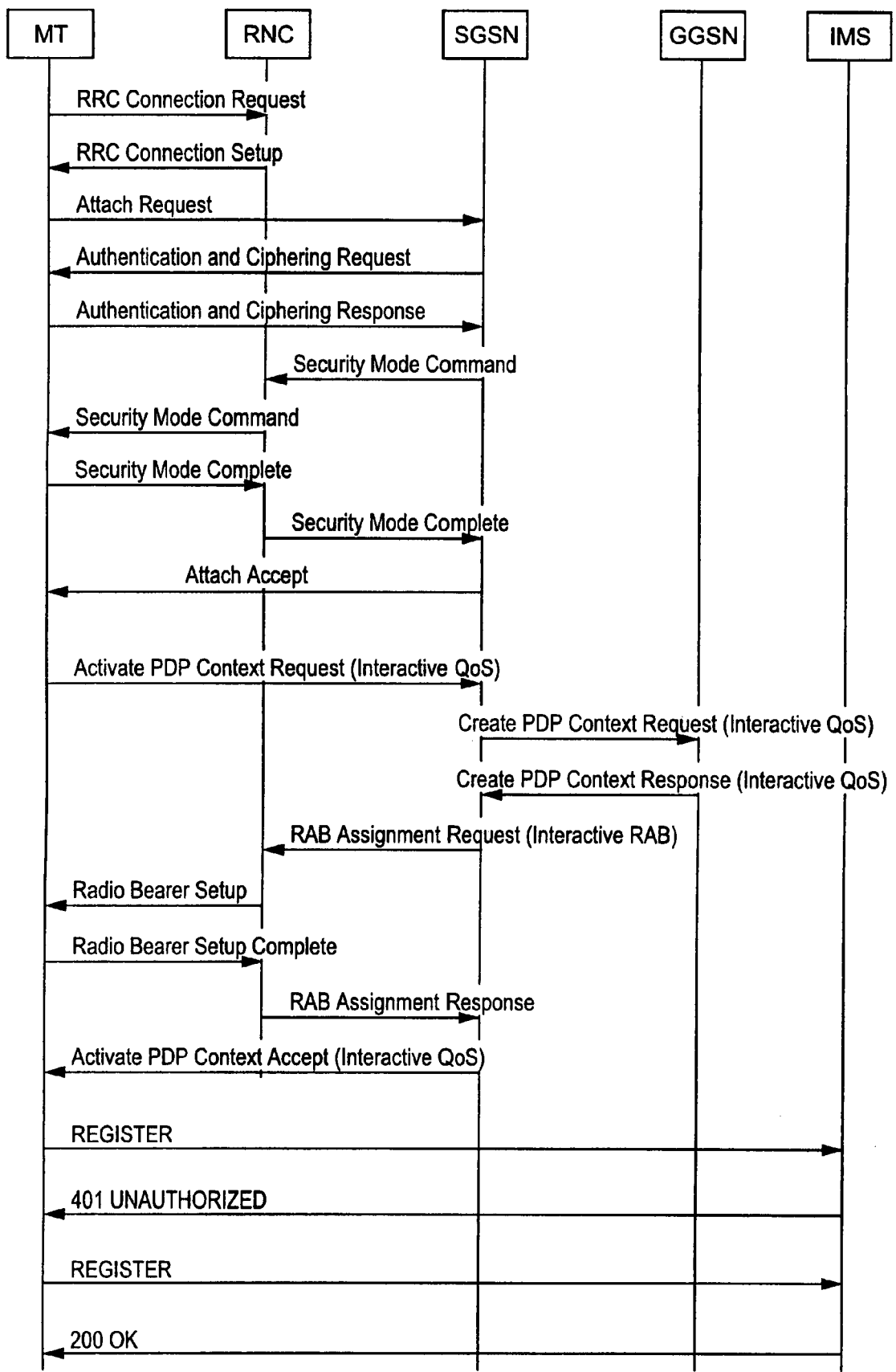
FIG. 7 is an example signaling diagram showing a mobile terminal attaching to the network, establishing a primary PDP context and a session signaling RAB, and registering with the IMS in a GPRS/UMTS access network.

Example signaling to establish a primary PDP context and register with the IMS for the system in FIG. 4 is shown in FIG. 7. Briefly, the MT sends a Radio Resource Control (RRC) Connection Request to the RNC, which responds with an RRC Connection Setup message. The MT sends an Attach Request to the SGSN via the RNC, which responds with several authentication, ciphering, and security mode requests. After the MT satisfies those requests, the SGSN sends an Attach Accept message to the MT.

At this point, the MT sends an Activate PDP Context Request message to the SGSN, which includes a requested QoS profile. The SGSN sends a "Create PDP Context Request" to the GGSN carrying the QoS profile. Based on this profile, an admission control is performed at the GGSN level, and the GGSN may restrict the QoS if, for example, the system is overloaded. The GGSN stores the PDP context in a database. The GGSN returns the negotiated QoS to the SGSN in a "Create PDP Context Response" message, and the SGSN stores the PDP context in its database. The SGSN sends a "RAB Assignment Request" to the RNC in the RAN to establish a radio access bearer (RAB) service to carry the RAB QoS attributes. For the session signaling, a RAB with an interactive QoS is requested. From the interactive class QoS attributes, the RNC determines the radio-related parameters corresponding to the QoS profile, e.g., transport format set, transport format combination set, etc. The RNC sends a "Radio Bearer Set-up" message to the MT. When the RAN and the MT are ready to transfer traffic, a Radio Bearer Setup Complete message is sent to the RNC and a "RAB Assignment Complete" message, is sent to the SGSN. The negotiated QoS, here an interactive QoS class, is sent from the SGSN to the MS in an "Activate PDP Context Accept" message.

Once the primary PDP context is activated and the corresponding RAB and RBs are set up, the MT registers with the IMS. The MT sends a SIP Register message via the primary PDP context and corresponding bearers to the IMS. The IMS responds with a SIP 401 Unauthorized message. If the user is not registered, the 401 message is sent to the user including a challenge. The user includes the response to the challenge in the next register message, and the CSCF checks the response. If the response is correct, the CSCF knows the user is authentic. The MT repeats the Register message, and the IMS responds with a SIP 200 OK message indicating that the MT is registered with the IMS and may initiate (or participate in) a multimedia session.

Figure 8A:
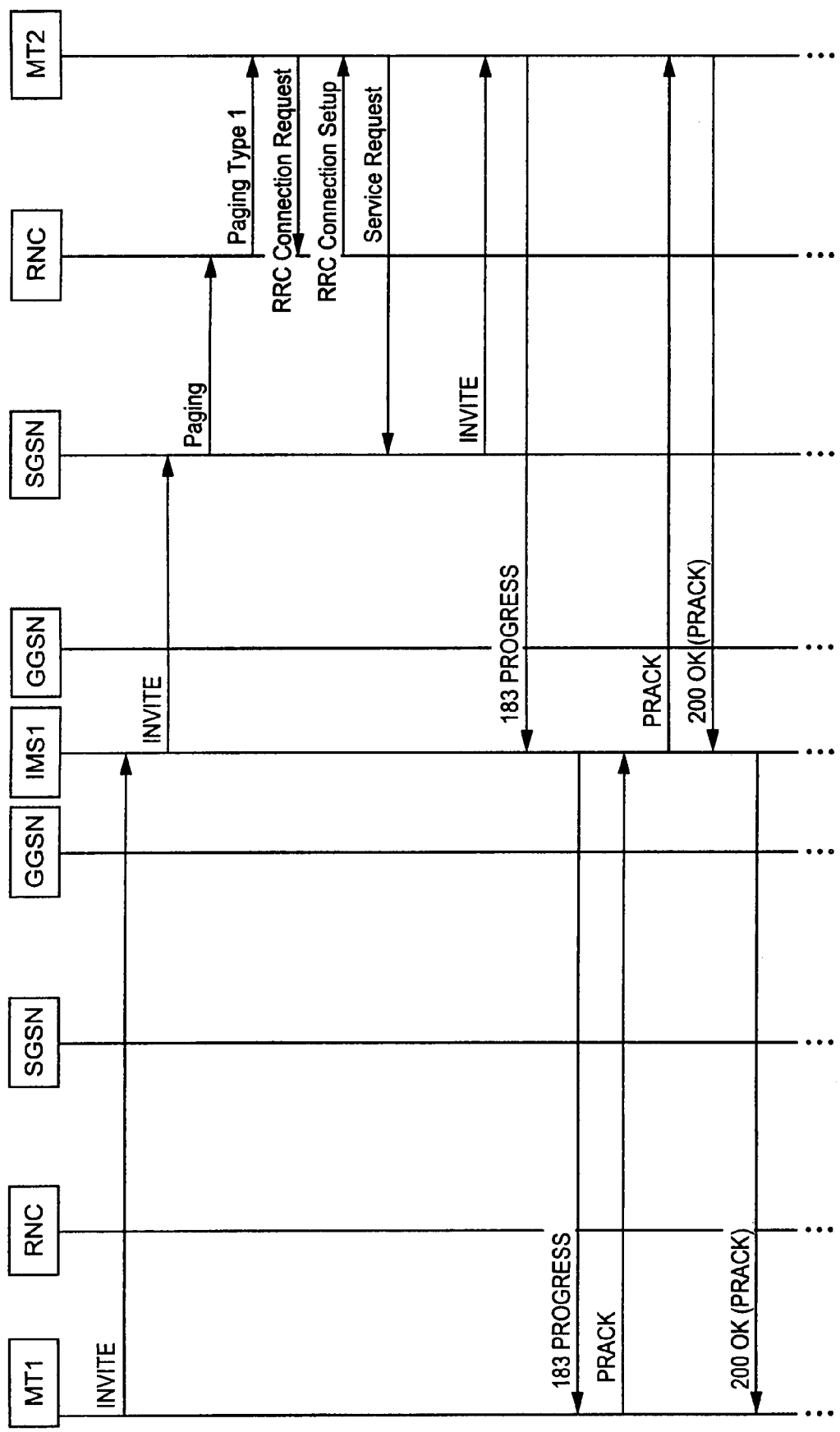
FIGS. 8A-8C illustrate example signaling message exchanges for establishing dedicated RABs for a voice media packet stream and media control messages as part of establishing a multimedia session with packet-based, voice IMS service.
Figure 8B:
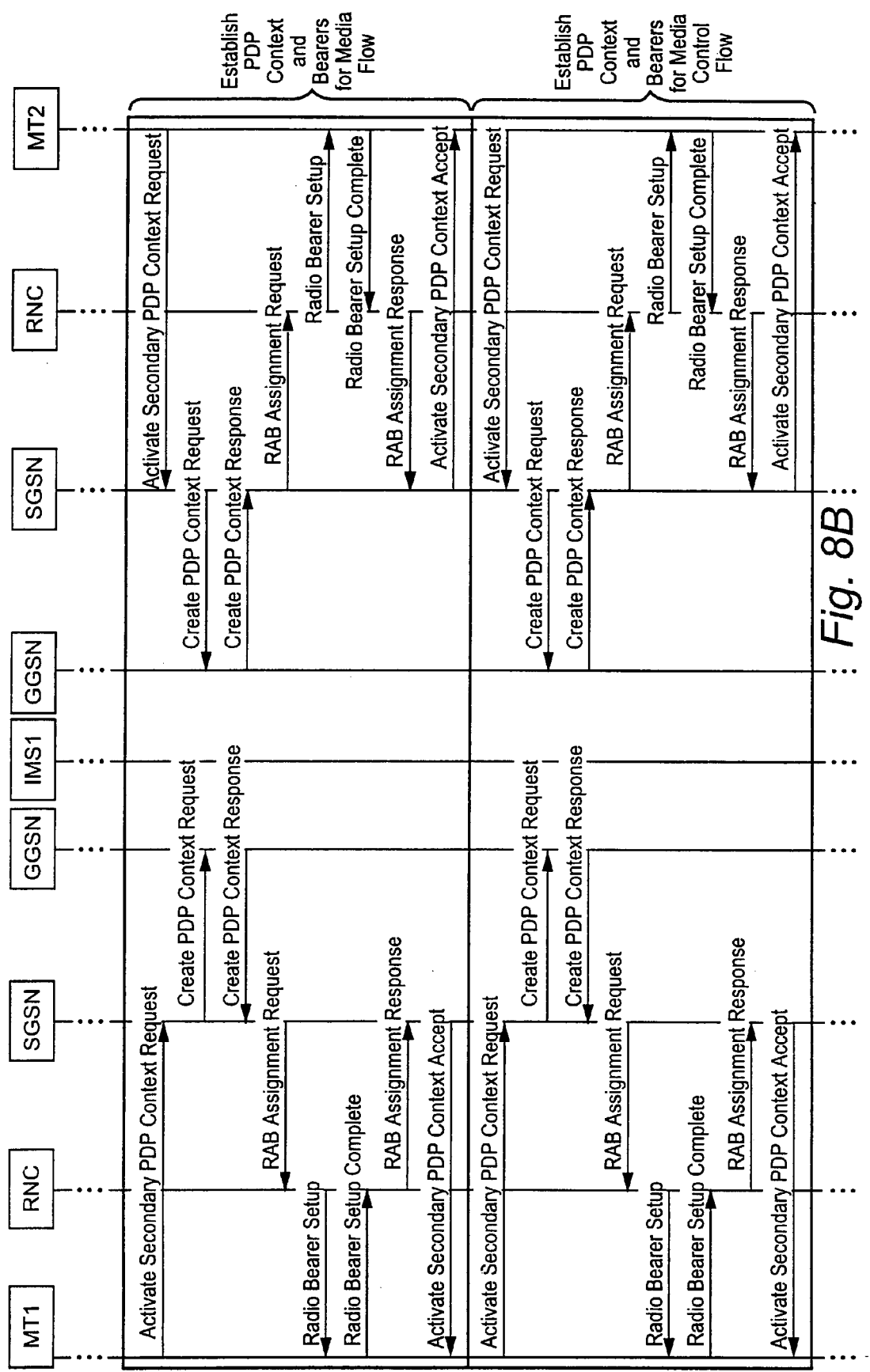
Figure 8C:
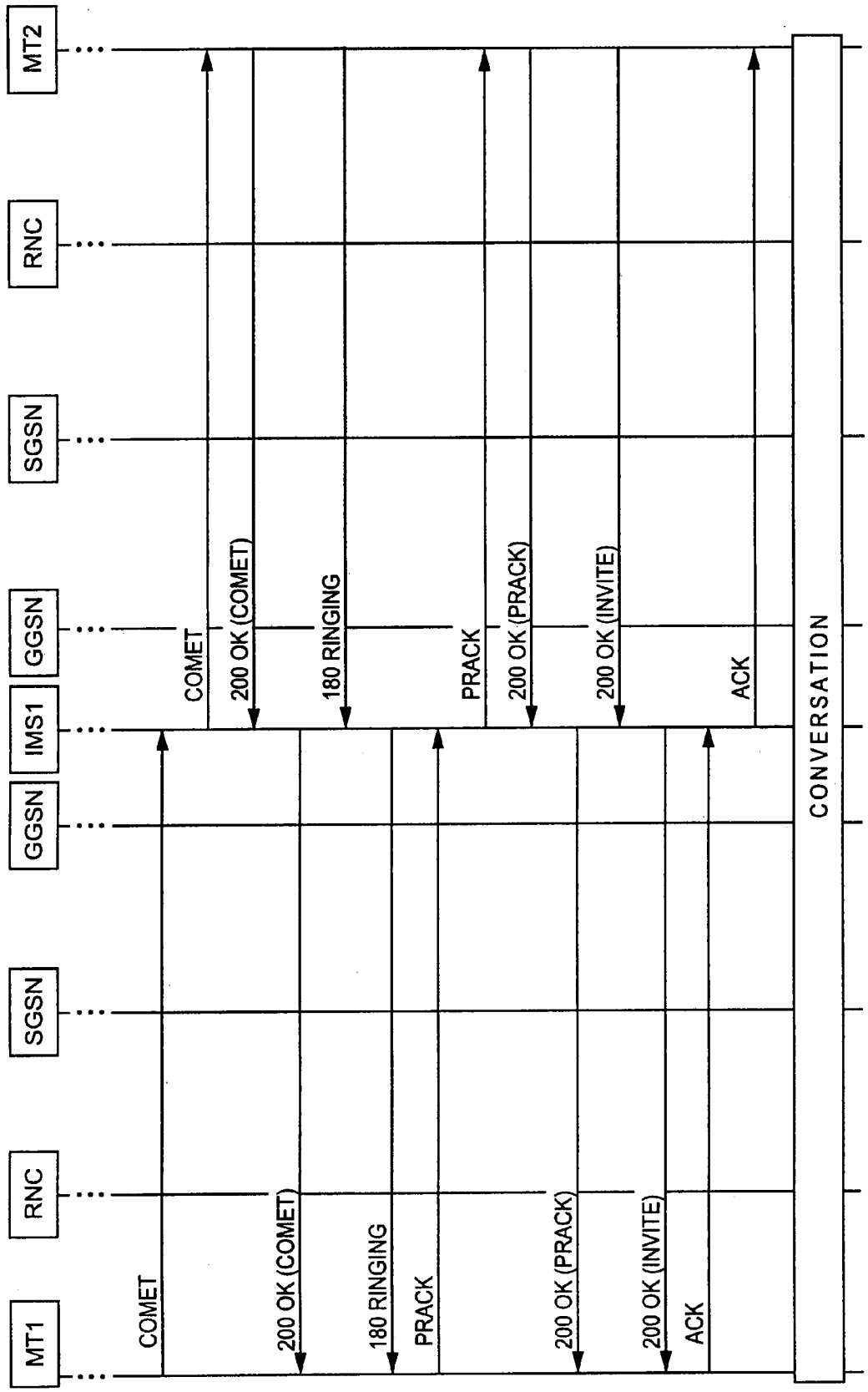

An example signaling flow diagram for an example conversational IMS session between a mobile terminal MT1 and a remote MT2 is shown in FIGS. 8A-8C Initially, and as explained above in FIG. 7, MT1 establishes a first PDP context with the GGSN to be supported by a session signaling bearer needed to establish the multimedia session. The MT1 sends a SIP INVITE message on the signaling bearer to the IMS to setup the conversational IP multimedia session. The INVITE message includes the session details regarding the number of media flows and requested corresponding quality of service. The IMS authenticates MT1 as a subscriber and authorizes the session. The SIP INVITE message is forwarded to MT2 via external networks. MT2 confirms the session request in a SIP "183" Progress message returned to the IMS. The SIP 183 is an acknowledgement message to the SIP INVITE message. The IMS confirms the session, and delivers a session ID in a SIP 183 Progress message to the MT1. SIP PRACK and 200 OK PRACK acknowledgement messages are exchanged between the MT1 and MT2 via the IMS so that a session may established.

In order to establish a PDP context and corresponding bearer for the media (voice) application flow for the session, MT1 sends and activates a second PDP context request message via RNC to the SGSN. The SGSN sends a Create PDP Context Request to the GGSN, and the GGSN returns a Create PDP Context Response message. Each PDP context message includes a request for a conversational class quality of service. The SGSN then sends an RAB Assignment Request to the RNC requesting a conversational RAB. A Radio Bearer Setup message is sent from the RNC to MT1, and MT1 responds with a Radio Bearer Setup Complete message. The RNC then forwards an RAB Assignment Response message to the SGSN, which returns an Activate Secondary PDP Context Accept message specifying a conversational quality of service. A similar set of procedures for establishing a secondary PDP context, corresponding RAB, and corresponding radio bearers is performed by MT2 with its local access network nodes.

Both MT1 and MT2 then perform similar procedures to establish a secondary PDP context and corresponding radio access bearers for media control packets for the session as indicated by the second brace in FIG. 8. However, in this message exchange, the PDP context messages specify an interactive quality of service and the RAB assignment messages will specify an interactive RAB.

With the session PDP contexts and bearers with their desired quality of services established, the mobile terminals MT1 and MT2 exchange SIP messages indicating that both MT1 and MT2 are ready to proceed with their conversation. During the session, if the voice and voice control streams are inactive for a period of time, the corresponding radio access and radio bearers may be released to conserve radio resources. But the session radio access bearer and radio bearer(s) are preferably maintained for the life of the session. This facilitates establishing another session involving MT1.

In the second, example, "two bearer" embodiment shown in FIG. 3B, the session signaling and the voice media control messages share a single radio bearer with an interactive class of QoS. As in the first embodiment, the voice media packets, (e.g., RTP), are supported by a dedicated bearer with a conversational class of QoS. The session signaling load, (e.g., SIP signaling), normally is heavy during the session setup, and the voice media control message load, (e.g., RTCP), picks up after the session is setup. Although not identical, both streams carry signaling information. This time division and characteristic similarity permit sharing a single bearer. One interactive QoS bearer (preferably high priority) supports both the session setup signaling and the voice media control signaling. There may be some delays whenever both session signaling and voice media control signaling require transmission at the same time. One example of such a delay would occur when a service is added, dropped, or changed in the middle of the session. Such delay, however, may be an acceptable tradeoff in order to reduce the number of bearers by one.

A session may include media in addition to voice, e.g., text, video, etc. Each additional media has its own media and media control flows that require additional PDP context and radio access bearers. One way to do this is to activate a new PDP context for each additional media flow and media control flow. There may be situations where all the RTCP flows may be multiplexed onto a single PDP context without loosing much quality. Alternatively, all RTCP flows could be multiplexed onto the same PDP context as the SIP signaling. Although this would impact performance, it may be an acceptable compromise in some situations.

With this technology, conversational IP voice services can be provided which deliver high speech quality both in terms of fidelity and low delay because each information flow is supported with a quality of service that meets its specific needs and only uses the radio resources according to its specific needs. While the technology has been described with respect to particular example embodiments, those skilled in the art will recognize that the technology is not limited to these specific example embodiments. Different formats, embodiments, and adaptations besides those shown and described as well as many variations, modifications, and equivalent arrangements may also be used. The invention is limited only by the scope of the claims appended hereto

What is claimed is:

1. A method for establishing a session involving a mobile radio terminal configured to access a packet-based access network via a radio access network, comprising:

establishing a first bearer with an interactive quality of service extending between the mobile terminal and the packet-based access network;

using the first bearer to initiate a session that includes a packet-based voice communication and to carry one or more session messages for implementing a packet-based voice service;

establishing a second bearer with a conversational quality of service for the session extending between the mobile terminal and the packet-based access network and carrying voice packets associated with the packet-based voice service; and using the first bearer with the interactive quality of service to carry control messages associated with the packet-based voice service, wherein the first and second bearers are radio access bearers (RABs) and the method further comprises:

establishing a first Packet Data Protocol (PDP) context for session messages relating to the packet-based voice service and for control messages associated with the voice packets;

mapping the first PDP context onto the first RAB;

establishing a second PDP context for voice packets; and mapping the second PDP context onto the second RAB.

2. The method in claim 1, further comprising:

establishing a priority for the first bearer.

3. The method in claim 1, wherein the session messages are Session Initiation Protocol (SIP) messages carrying Session Description Protocol (SDP) information over a User Datagram Protocol (UDP), the voice packets are carried by the Real-Time Transport Protocol (RTP) protocol over UDP, and the control messages associated with the voice packets are Real-Time Control Protocol (RTCP) messages over UDP.

4. A node for use a mobile communications system that includes in a packet-based access network, comprising electronic circuitry configured to perform the following tasks related to establishing an IP session:

coordinate with a mobile radio terminal to establish a first bearer with a conversational quality of service extending between the mobile radio terminal and the packet-based access network configured to establish the IP session including a conversational IP service and to carry one or more session messages for implementing the conversational IP service;

coordinate with the mobile radio terminal to establish a second bearer with a conversational quality of service for the IP multimedia session extending between the mobile radio terminal and the packet-based access network to carry voice packets associated with the conversational IP service; and coordinate with the packet-based access network node to configure the first bearer with the conversational quality of service to carry control messages associated with the conversational IP service, wherein the bearers are radio access bearers (RABs) and the electronic circuitry is further configured to:

establish a first Packet Data Protocol (PDP) context for session messages relating to the packet-based voice service and for control messages associated with the voice packets;

map the first PDP context onto the first RAB;

establish a second PDP context for voice packets; and map the second PDP context onto the second RAB.

5. The node in claim 4, wherein the node is a Serving GPRS Support Node (SGSN) in a General Packet Radio Services (GPRS) network.

6. The node in claim 4, wherein the node is a mobile radio terminal or a fixed network node.

7. The node in claim 4, wherein the session messages are application control Session Initiation Protocol (SIP) messages carrying Session Description Protocol (SDP) information over User Datagram Protocol (UDP), the voice packets are carried by the Real-Time Transport Protocol (RTP) protocol over UDP, and the control messages associated with the voice packets are media control Real-Time Control Protocol (RTCP) messages over UDP.

8. The node in claim 4, wherein the session is a multimedia session and the electronic circuitry is further configured to establish an additional bearer for a session media flow other than the voice packets.

9. The node in claim 8, wherein the electronic circuitry is further configured to multiplex media control signaling for the additional bearer for the other session media flow onto the first PDP context which is mapped onto the first RAB.

10. The method in claim 1, wherein the session is a multimedia session and the method further comprises establishing an additional bearer for a session media flow other than the voice packets.

11. The method in claim 10, wherein the method further comprises multiplexing media control signaling for the additional bearer for the other session media flow onto the first PDP context which is mapped onto the first RAB.

* * * * *

UNITED STATES PATENT AND TRADEMARK OFFICE
CERTIFICATE OF CORRECTION

PATENT NO. : 7,613,147 B2  Page 1 of 1
APPLICATION NO. : 11/806569
DATED : November 3, 2009
INVENTOR(S) : Bergenlid et al.

It is certified that error appears in the above-identified patent and that said Letters Patent is hereby corrected as shown below:

In Column 1, Line 28, delete "10/353,737," and insert -- 10/356,737, --, therefor.

In Column 2, Line 1, delete "network" and insert -- network, --, therefor.

In Column 2, Line 6, delete "network" and insert -- network. --, therefor.

In Column 2, Line 11, delete "network" and insert -- network. --, therefor.

In Column 2, Line 16, delete "network" and insert -- network. --, therefor.

In Column 2, Line 23, delete "network" and insert -- network. --, therefor.

In Column 2, Line 25, after "like a" insert -- UMTS --.

In Column 2, Line 26, delete "GPRS network" and insert -- GPRS network. --, therefor.

In Column 6, Lines 5-6, delete "MultimedialSession" and insert -- Multimedia Session --, therefor.

In Column 7, Line 41, delete "IMS)" and insert -- (IMS) --, therefor.

In Column 8, Line 13, delete "networks" and insert -- network. --, therefor.

In Column 9, Line 33, delete "message," and insert -- message --, therefor.

In Column 9, Line 52, delete "FIGS. 8A-8C" and insert -- FIGS. 8A-8C. --, therefor.

In Column 11, Line 13, delete "hereto" and insert -- hereto. --, therefor.

Signed and Sealed this

Eighteenth Day of May, 2010

David J. Kappos
*Director of the United States Patent and Trademark Office*